United States Patent
Stephens et al.

(10) Patent No.: US 9,586,092 B1
(45) Date of Patent: *Mar. 7, 2017

(54) GOGGLES WITH RETROSCOPIC LENS ANGLE FOR ENHANCED FORWARD VISION

(71) Applicant: Roka Sports, Inc., Dallas, TX (US)

(72) Inventors: Mark Stephens, Dallas, TX (US); Robert Canales, Dallas, TX (US); Kurt Spenser, Burbank, CA (US); Nathan Tracy, Oceanside, CA (US)

(73) Assignee: ROKA SPORTS, INC., Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,327

(22) Filed: May 9, 2016

Related U.S. Application Data (63) Continuation of application No. 14/838,857, filed on Aug. 28, 2015, now Pat. No. 9,364,718.

(60) Provisional application No. 62/210,718, filed on Aug. 27, 2015.

(51) Int. Cl.
*G02C 1/00* (2006.01)
*A63B 33/00* (2006.01)
*G02C 7/02* (2006.01)

(52) U.S. Cl.
CPC ............ *A63B 33/002* (2013.01); *G02C 7/022* (2013.01); *A63B 2033/004* (2013.01)

(58) Field of Classification Search
CPC ... A63B 33/002; A63B 2244/20; A63B 33/00; G02C 3/003

USPC .... 351/43, 45, 46, 41, 158, 156, 157; 2/426, 2/433, 440
See application file for complete search history.

(56) References Cited

U.S. PATENT DOCUMENTS

| | | | |
|---|---|---|---|
| 5,204,700 | A | 4/1993 | Sansalone |
| 5,655,228 | A | 8/1997 | Chiang |
| D395,666 | S | 6/1998 | Yashiro |
| 5,774,201 | A | 6/1998 | Tackles |
| D415,780 | S | 10/1999 | Minamidani |
| 6,006,367 | A | 12/1999 | Webster |
| 6,023,791 | A | 2/2000 | Chiang |
| D435,057 | S | 12/2000 | Chen |
| 6,272,693 | B1 | 8/2001 | Godoy |
| 6,349,420 | B1 | 2/2002 | Chiang |

(Continued)

FOREIGN PATENT DOCUMENTS

| | | |
|---|---|---|
| CN | 1694747 A | 11/2005 |
| CN | 2929762 Y | 8/2007 |

(Continued)

OTHER PUBLICATIONS

Cobra Ultra. Arena Water Instinct Official Website http://www.arenawaterinstinct.com/en_global/cobra-ultra.htm [accessed Aug. 2015].

(Continued)

*Primary Examiner* — Hung Dang
(74) *Attorney, Agent, or Firm* — Wilson, Sonsini, Goodrich & Rosati (57) ABSTRACT

Swimming goggles are provided with a retroscopic lens angle and broad peripheral viewing angles to enhance a swimmer's forward-to-cranial-looking vision and peripheral vision both above and below the waterline during swimming activity.

32 Claims, 6 Drawing Sheets

(56) References Cited

U.S. PATENT DOCUMENTS

| | | | |
|---|---|---|---|
| 6,513,170 B1 | 2/2003 | Chiang | |
| 7,007,310 B2 | 3/2006 | Chiang | |
| 7,159,250 B2 | 1/2007 | Chiang | |
| 7,165,837 B2 | 1/2007 | Yokota et al. | |
| D620,516 S | 7/2010 | Hadehara | |
| 7,941,874 B2 | 5/2011 | Chou | |
| D649,176 S | 11/2011 | Booker | |
| 8,955,170 B2 | 2/2015 | Chiang | |
| 9,364,718 B1* | 6/2016 | Tracy | A63B 33/002 |
| 2005/0193479 A1 | 9/2005 | Atta et al. | |
| 2006/0010587 A1 | 1/2006 | Yokota et al. | |
| 2010/0257660 A1 | 10/2010 | Chou | |
| 2014/0041106 A1 | 2/2014 | Shau | |

FOREIGN PATENT DOCUMENTS

| | | |
|---|---|---|
| CN | 201375783 Y | 1/2010 |
| DE | 202007014933 U1 | 12/2007 |
| DE | 102012107859 A1 | 2/2014 |

OTHER PUBLICATIONS

Co-pending U.S. Appl. No. 14/838,857, filed Aug. 28, 2015.
Co-pending U.S. Appl. No. 29/537,862, filed Aug. 28, 2015.
Swedix Mirror Goggle. Arena water Instinct Official Website http://www.arenawaterinstinct.com/en_global/swedix-mirror-goggle-smoke-silver-black.htm [accessed Aug. 2015].
U.S. Appl. No. 14/838,857 Office Action dated Feb. 3, 2016.
X-Vision Mirror Goggle. Arena Water Instinct Official Website http://www.arenawaterinstinct.com/en_global/x-vision-mirror-goggle-smoke-blue-black-sil.htm [accessed Aug. 2015].

* cited by examiner

GOGGLES WITH RETROSCOPIC LENS ANGLE FOR ENHANCED FORWARD VISION

CROSS-REFERENCE

The present application is a continuation of U.S. application Ser. No. 14/838,857, filed Aug. 28, 2015, now U.S. Pat. No. 9,364,718, which claims priority to and incorporates by reference in its entirety, U.S. Provisional Application No. 62/210,718, filed Aug. 27, 2015, entitled "GOGGLES WITH RETROSCOPIC LENS ANGLE FOR ENHANCED FORWARD VISION".

BACKGROUND OF THE INVENTION

Current swim goggles and mask designs use lenses to help enhance vision under water, typically at an angle that is parallel to the user's normal line of sight when their head is down in the water, looking primarily beneath or slightly in front of the user. Further, swim goggles and masks are typically engineered with excess material at the top of the lens/frame area.

SUMMARY OF THE INVENTION

Provided herein are swim goggles and mask designs that allow users to focus on forward-looking vision for use above and below the waterline, and/or which allow improved vision along the user's peripheral field of view. Such goggles and masks provide the user additional viewing planes and angles as compared to traditional goggles and masks. Such swim goggles and masks make it easier to focus on forward-looking vision and provide greater peripheral vision both above and below the waterline without the need for the swimmer to excessively raise their head.

Provided herein are swimming goggles with a retroscopic lens angle and broad peripheral viewing angles to enhance a swimmer's forward-to-cranial-looking vision and peripheral vision both above and below the waterline during swimming activity.

Provided herein are swimming goggles comprising a first eye piece comprising a first retroscopic lens surface in a retroverted frontal plane wherein an angle of retroversion as measured from an inferior edge to a superior edge of the lens surface is greater than 10 degrees with respect to an orthogonal plane of a visual axis of a user's direct line of sight through the first retroscopic lens, wherein the first retroscopic lens provides an available cranial-looking range of vision of at least 50 degrees, and a first uninterrupted contiguous side lens surface providing an available central fixation to temporal peripheral range of vision of at least 80 degrees.

In some embodiments, the goggles further comprise a second eye piece comprising a second retroscopic lens surface in the retroverted frontal plane wherein an angle of retroversion as measured from an inferior edge to a superior edge of the lens surface is greater than 10 degrees with respect to the orthogonal plane of the visual axis of the user's direct line of sight through the second retroscopic lens, wherein the second retroscopic lens provides an available cranial-looking range of vision of at least 50 degrees, and a second uninterrupted contiguous side lens surface providing an available central fixation to temporal peripheral range of vision of at least 80 degrees.

In some embodiments, the first uninterrupted contiguous side lens surface is retroverted at an angle as measured from an inferior edge to a superior edge of the lens surface at an angle of greater than 10 degrees with respect to the orthogonal plane of the visual axis of a user's peripheral line of sight.

In some embodiments, the first uninterrupted contiguous side lens surface is curved from an anterior aspect to a posterior aspect.

In some embodiments, the first retroscopic lens surface is flat as measured from a medial edge to a lateral edge of the retroverted lens surface in the frontal plane.

In some embodiments, the first retroscopic lens surface has a medial to lateral width between 44.0 mm and 50.0 mm in the frontal plane.

In some embodiments, the first retroscopic lens surface has an inferior to superior height between 28.0 mm and 40.0 mm in the frontal plane.

In some embodiments, the first retroscopic lens surface has a width to height ratio between approximately 1.60:1 and 1.30:1 in the frontal plane.

In some embodiments, the first retroscopic lens surface comprises a medial to lateral radius of curvature less than or equal to 20 degrees in the frontal plane of the retroverted lens surface as measured from the pupil of the eye. In some embodiments, the first retroscopic lens surface comprises a radius of curvature less than or equal to 10 degrees as measured from an inferior edge to a superior edge as measured from the pupil of the eye.

In some embodiments, the retroscopic lens surface comprises a minimum medial to lateral radius of curvature of 15 mm, or a maximum diopter of 22.5 in the frontal plane of the retroverted lens surface. In some embodiments, the first retroscopic lens surface comprises a minimum inferior edge to a superior edge radius of curvature of 30 mm, or a maximum diopter of 11.25.

In some embodiments, any of the lens surfaces are colored or tinted to reduce light glare or sunlight reflection.

In some embodiments, a field of vision of the user is an island of vision measuring approximately 90 degrees temporally to central fixation, at least 50 degrees superiorly and approximately 50 degrees nasally.

In some embodiments, the first eye piece further comprises a circumferential portion encapsulating the frontal plane retroscopic lens surface and an uninterrupted contiguous side lens surface to form an outer eye socket cup adapted to approximately fit about the structural facial features of the user's eye socket, wherein an inferior cheekbone portion of said outer eye socket cup extends beyond a superior eyebrow portion of said outer eye socket cup when viewed in a plane approximately parallel to a side of the user's face.

In some embodiments, the first eye piece further comprises an interior contact portion adapted for contact with the soft tissue within the eye socket, and circumferentially around the eye of the user.

In some embodiments, the superior portion of the outer eye socket cup is further adapted to fit within the structural features the user's eye socket approximately flush to the top rim of the eye socket at or below the eyebrow.

In some embodiments, the contact portion of the eye piece is further adapted to create a water-tight seal.

In some embodiments, the contact portion of the eye piece comprises a flexible polymer or foam.

In some embodiments, the first outer eye socket cup further comprises a temporal extension with a posteriorly extended attachment feature adapted for receiving a head attachment band.

In some embodiments, the first eye piece and second eye piece are connected by a flexible bridging member. In some embodiments, the flexible bridging member is disassociable from each eye piece. In some embodiments, the flexible bridging member is provided in two or more lengths.

In some embodiments, the retroscopic lens surface has an angle of retroversion between at least 10.01 degrees and approximately 20.0 degrees. In some embodiments, the retroscopic lens surface has an angle of retroversion between at least 10.01 degrees and approximately 13.5 degrees. In still other embodiments, the retroscopic lens surface has an angle of retroversion between 10.5 degrees and approximately 12.5 degrees.

Provided herein is a swimming mask assembly comprising a first eye piece and a second eye piece configured to provide forward-to-cranial-looking vision to a user in a prone or supine position, the first eye piece comprising a first retroscopic lens surface in a frontal plane wherein an angle of retroversion as measured from an inferior edge to a superior edge of the lens surface is greater than 10 degrees with respect to an orthogonal plane of the visual axis of the user when the mask is worn by the user.

In some embodiments, the swimming mask further comprises a second retroscopic lens surface in the frontal plane of the second eye piece wherein an angle of retroversion as measured from an inferior edge to a superior edge of the lens surface is greater than 10 degrees with respect to the orthogonal plane of the visual axis of the user when the mask is worn by the user.

In some embodiments, the first retroscopic lens surface further comprises an uninterrupted contiguous first side lens surface providing an available central fixation to temporal peripheral range of vision of at least 80 degrees.

In some embodiments, the first retroscopic lens surface provides an available cranial-looking range of vision of at least 50 degrees above direct line of sight.

In some embodiments, the first contiguous side lens surface is curved from an anterior aspect to a posterior aspect. In some embodiments, the first contiguous side lens surface is retroverted greater than 10 degrees as measured from an inferior edge to a superior edge of the lens surface.

In some embodiments, the first uninterrupted retroscopic lens surface is flat as measured from a medial edge to a lateral edge.

In some embodiments, the first uninterrupted retroscopic lens surface has a medial to lateral width between 44.0 mm and 50.0 mm. In some embodiments, the first uninterrupted retroscopic lens surface has an inferior to superior height between 28.0 mm and 40.0 mm.

In some embodiments, the first uninterrupted retroscopic lens surface has a width to height ratio between approximately 1.60:1 and 1.30:1.

In some embodiments, the retroscopic lens surface comprises a minimum medial to lateral radius of curvature of 15 mm, or a maximum diopter of 22.5 in the frontal plane of the retroverted lens surface. In some embodiments, the first retroscopic lens surface comprises a minimum inferior edge to a superior edge radius of curvature of 30 mm, or a maximum diopter of 11.25.

In some embodiments, any of the lens surfaces are colored or tinted to reduce light glare or sunlight reflection.

In some embodiments, the first eye piece further comprises a circumferential portion encapsulating the retroscopic lens surface and the first uninterrupted contiguous side lens to form an eye socket cup adapted to approximately fit the facial features of the user's eye socket wherein an inferior cheekbone portion of said eye socket cup extends beyond a superior eyebrow portion of said eye socket cup when viewed in a plane approximately parallel to a side of the user's face.

In some embodiments, the retroscopic lens surface has an angle of retroversion between at least 10.01 degrees and approximately 20.0 degrees. In some embodiments, the retroscopic lens surface has an angle of retroversion between at least 10.01 degrees and approximately 13.5 degrees. In some embodiments, the retroscopic lens surface has an angle of retroversion between 10.5 degrees and approximately 12.5 degrees.

In some embodiments, a field of vision of the user is an island of vision measuring approximately 70 to 110 degrees temporally to central fixation, approximately 50 degrees superiorly, approximately 50 degrees inferiorly and approximately 50 degrees nasally.

In some embodiments, the first eye piece further comprises a contact portion adapted for contact with the soft tissue around the eye in the eye socket of the user. In some embodiments, the contact portion of the eye piece is further adapted to create a water-tight seal.

In some embodiments, the first eye socket cup further comprises a temporal extension with a posteriorly extended attachment feature adapted for a head attachment band.

In some embodiments, the first and second eye pieces are connected by a flexible bridging member. In some embodiments, the flexible bridging member is disassociable from the first and second eye pieces. In some embodiments, the flexible bridging member is provided in two or more interchangeable lengths.

Provided herein are swimming goggles comprising a first eye piece and a second eye piece, each eye piece having a retroscopic lens surface in a retroverted frontal plane, comprising a first lens surface and a second lens surface, configured to raise the line of sight of the eyes of a user cranially to at least 50 degrees above direct line of sight in order to visually sight objects in a forward-to-cranial-looking view when the user is in a prone position.

In some embodiments, each retroscopic lens surface has an angle of retroversion between at least 10.01 degrees and approximately 20.0 degrees. In some embodiments, each retroscopic lens surface has an angle of retroversion between at least 10.01 degrees and approximately 13.5 degrees. In some embodiments, each retroscopic lens surface has an angle of retroversion between 10.5 degrees and approximately 12.5 degrees.

In some embodiments, the first retroscopic lens surface further comprises a first uninterrupted contiguous side lens surface and the second retroscopic lens surface further comprises a second uninterrupted contiguous side lens surface providing an available central fixation to temporal peripheral range of vision of at least 80 degrees for each eye piece.

In some embodiments, the first and second contiguous side lens surface is curved from an anterior aspect to a posterior aspect.

In some embodiments, the first and second contiguous side lens surface is retroverted greater than 10 degrees as measured from an inferior edge to a superior edge of the lens surface.

In some embodiments, the first retroscopic lens surface is flat as measured from a medial edge to a lateral edge.

In some embodiments, the first retroscopic lens surface has a medial to lateral width between 44.0 mm and 50.0 mm. In some embodiments, the first retroscopic lens surface has an inferior to superior height between 28.0 mm and 40.0 mm. In some embodiments, the first retroscopic lens surface has a width to height ratio between approximately 1.60:1 and 1.30:1.

In some embodiments, the retroscopic lens surface comprises a minimum medial to lateral radius of curvature of 15 mm, or a maximum diopter of 22.5 in the frontal plane of the retroverted lens surface. In some embodiments, the first retroscopic lens surface comprises a minimum inferior edge to a superior edge radius of curvature of 30 mm, or a maximum diopter of 11.25.

In some embodiments, any of the lens surfaces are colored or tinted to reduce light glare or sunlight reflection.

In some embodiments, each of the first and second eye pieces further comprise a circumferential portion encapsulating the first and second retroscopic lens surfaces and the first and second uninterrupted contiguous side lens surfaces to form first and second eye socket cups adapted to approximately fit the facial features around the user's eye sockets, wherein an inferior cheekbone portion of each first and second eye socket cup extends beyond a superior eyebrow portion of each first and second eye socket cup when viewed from a plane approximately parallel to the side of user's face.

In some embodiments, a field of vision for an eye of the user is an island of vision measuring approximately 70 to 110 degrees temporally to central fixation, at least 50 degrees superiorly when the eye of the user is above or below the waterline, and approximately 50 degrees nasally.

In some embodiments, each of the first and second eye pieces further comprise a contact portion adapted for contact with the soft tissue around the eye in the eye socket of the user.

In some embodiments, the contact portion of the eye piece is further adapted to create a water-tight seal.

In some embodiments, the first and second eye socket cups each further comprise a temporal extension with a posteriorly extended attachment feature adapted for a head attachment band.

In some embodiments, the first and second eye pieces are connected by a flexible bridging member. In some embodiments, the flexible bridging member is disassociable from each piece.

Provided herein is a kit for swimming goggles comprising a first eye piece comprising a first retroscopic lens surface, a second eye piece comprising a second retroscopic lens surface, wherein each first and second retroscopic lens surface is positioned in a retroverted frontal plane configured to raise a line of sight of a user cranially to at least 50 degrees above a direct line of sight in a forward-to-cranial-looking view, either above or below a waterline; a first uninterrupted contiguous side lens surface affixed to the first retroscopic lens surface, a second uninterrupted contiguous side lens surface affixed to the second retroscopic lens surface, a first eye socket cup circumferentially encapsulating the first retroscopic lens surface and the first uninterrupted contiguous side lens surface, a second eye socket cup circumferentially encapsulating the second retroscopic lens surface and the second uninterrupted contiguous side lens surface; a first contact portion on the first eye piece adapted for contact with a soft tissue around a first eye in a first eye socket of a user, a second contact portion on the second eye piece adapted for contact with a soft tissue around a second eye in a second eye socket of a user; a first a temporal extension with an extended posterior temporal attachment feature in communication with the first eye socket cup, a second temporal extension with an extended posterior temporal attachment feature in communication with the second eye socket cup, wherein each temporal attachment feature is adapted to receive a flexible head attachment band; the flexible attachment band; and a flexible nose bridging member; wherein the first eye socket cup comprising the first retroscopic lens surface, the first uninterrupted contiguous side lens surface, the first contact portion and the first extended posterior temporal attachment feature, forms a first eye piece sub-assembly, wherein the second eye socket cup comprising the second retroscopic lens surface, the second uninterrupted contiguous side lens surface, the second contact portion and the second extended posterior temporal attachment feature, forms a second eye piece sub-assembly, and wherein the first eye piece sub-assembly and the second eye piece sub-assembly form an eye piece sub-assembly pair, wherein the eye piece sub-assembly pair is assemblable between the eye socket cups with the flexible bridging member and further assemblable with the flexible attachment band affixed to the first and second extended posterior temporal attachment feature.

In some embodiments, the eye socket cup is adapted to approximately fit the facial features around a user's eye socket wherein an inferior cheekbone portion of each said eye socket cup extends beyond a superior eyebrow portion of each said eye socket cup when viewed in a plane approximately parallel to a side of the user's face.

In some embodiments, the flexible bridging member is disassociable from the eye socket cup sub-assembly pair. In some embodiments, the kit comprises two or more sizes of flexible bridging member.

In some embodiments, the first and/or second retroscopic lens surface in the frontal plane is provided with prescription lenses.

In some embodiments, the first and second retroscopic lens surfaces have an angle of retroversion between at least 10.01 degrees and approximately 20.0 degrees. In some embodiments, the first and second retroscopic lens surfaces have an angle of retroversion between at least 10.01 degrees and approximately 13.5 degrees. In some embodiments, the first and second retroscopic lens surfaces have an angle of retroversion between 10.5 degrees and approximately 12.5 degrees.

In some embodiments, the first retroscopic lens surface in the frontal plane and the first uninterrupted contiguous side lens surface provide an available central fixation to temporal peripheral range of vision of at least 90 degrees.

In some embodiments, the first and second contiguous side lens surfaces are curved from an anterior aspect to a posterior aspect. In some embodiments, the first and second contiguous side lens surfaces are retroverted at least 10 degrees as measured from an inferior edge to a superior edge of the lens surface.

In some embodiments, the first and second retroscopic lens surfaces are flat as measured from a medial edge to a lateral edge of the retroverted lens surface.

In some embodiments, the first and second retroscopic lens surfaces have a medial to lateral width between 44.0 mm and 50.0 mm. In some embodiments, the first and second retroscopic lens surfaces have an inferior to superior height between 28.0 mm and 40.0 mm. In some embodiments, the first and second retroscopic lens surfaces have a width to height ratio between approximately 1.60:1 and 1.30:1.

In some embodiments, the retroscopic lens surface comprises a minimum medial to lateral radius of curvature of 15 mm, or a maximum diopter of 22.5 in the frontal plane of the retroverted lens surface. In some embodiments, the first retroscopic lens surface comprises a minimum inferior edge to a superior edge radius of curvature of 30 mm, or a maximum diopter of 11.25.

In some embodiments, any of the lens surfaces are colored or tinted to reduce light glare or sunlight reflection.

In some embodiments, a field of vision of each eye of the user is an island of vision measuring approximately 70 to 110 degrees temporally to central fixation, at least 50 degrees superiorly when the eyes of the user are above or below a waterline, and approximately 50 degrees nasally.

Provided herein are swimming goggles comprising a first eye piece and a second eye piece, each eye piece comprising a retroscopic lens surface in a frontal plane, wherein an angle of retroversion is measured from an inferior edge to a superior edge of the lens surface, wherein a user's forward-to-cranial-looking vision is increased by greater than 10 degrees with respect to the orthogonal plane of the visual axis of the user when swimming.

In some embodiments, the user's forward-to-cranial-looking vision is increased by up to approximately 20.0 degrees.

In some embodiments, the user's face is above the waterline. In some embodiments, the user's face is below the waterline.

In some embodiments, the user is in a prone position. In some embodiments, the user is in a supine position.

In some embodiments, the user improves their forward-to-cranial-looking vision by greater than 10 degrees without changing one's optimal head-neck angle when swimming in a prone position.

In some embodiments, the user improves their forward-to-cranial-looking vision by greater than 10 degrees without changing one's optimal head-neck angle when swimming in a supine position.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Current swim goggles, and more specifically goggles designed for swimming pool competition, do not focus on forward vision. The lenses are typically designed to allow the user to focus on the immediate area directly below and slightly in front of the user, in a narrow plane perpendicular to the user's face and essentially parallel to their line of sight when their head is down in the water, so that they can see a lane marker on the bottom of a pool, or, by raising their head slightly, the pool wall, as they approach the end of the pool. Alternatively, they may allow limited peripheral vision for citing competitors in adjacent lane positions as the user's head and body rolls with each stroke, and more particularly as they rotate their face or pick up their head to breathe between strokes, allowing the swimmer to see a competitor at an approximately adjacent 90 degrees angle relative to a plane that is parallel the user's face position during rotary breathing.

Competition swimming events have expanded tremendously to include many outdoor venues and open water competitions, (lakes, rivers, oceans, etc.). Unfortunately, the competition goggles designed for swimming pool competition provide only limited benefits to open water swimmers who are swimming in much larger bodies of water, typically with large numbers of other swimmers, and without the benefit of lane dividers or bottom surface markers.

While swimming in the open water, it is important for the user to frequently pick up their head in order to sight markers and competitors, and generally to look where they are swimming since they do not typically have the benefit of visible lane or bottom surface markers, with the possible exceptions of some world class competition events in clear, open-water locations such as Hawaii or similar locations. In open water competition swimming, it is also important for the user to be able to sight competitors and obstacles immediately in front or adjacent to them. This sighting motion requires the user to lift their head high enough to raise their eyes above water level in order to look forward or sideways to a buoy, boat, tree, or some other physical target above the surface to ensure they are swimming the correct direction. If the swimmer fails to sight well or swim straight, then they may fail to swim efficiently by zig-zagging their route.

In pool and closed-water environments, where the water is usually clear and lane dividers, bottom lane markers or bottom surface features are more clearly visible, it is still important for the user to be able to sight competitors adjacent to them. Additionally, it is beneficial if the swimmer does not need to significantly lift their head to crane their neck or arch their back to look forward with their eyes underwater to sight wall markers at the end of a pool lane (typically a "T" symbol), as this movement would compromise their dynamic swimming form.

Previous designs of swim goggles do not focus on this forward-sighting direction. In fact, current goggles usually obstruct this (forward-to-cranial-looking) viewing plane, causing the user to either crane their neck in the water or lift their head very high out of the water, by as much as 55 degrees or more for conventional goggles versus approximately 30 degrees or less for retroscopic goggles, in order to get a clear look at something in front of them underwater or for the sighting of a marker above the waterline. This motion affects the swimmers body alignment in the water, causing the neck and back to arch and their legs and feet to drop by as much as 35 degrees or more for conventional goggles versus approximately 23 degrees or less for retroscopic goggles. The longer and/or higher the user cranes their neck in the water or lifts their head out of the water, the more drag they generate when their legs and feet drop or sink in the water, forcing the swimmer to expend more crucial race energy on inefficient motion in order to overcome the drag, and ultimately slowing them down. Hence provided herein are better goggles or mask designs with a retroscopic lens angle to enhance a swimmer's forward-looking vision and provide a greater peripheral viewing angle during competitive swimming activity without the need for a swimmer to severely compromise their dynamic swimming form or uselessly expend unnecessary energy to see where they are going or to sight markers, obstacles and competitors immediately in front or adjacent to them when swimming.

Provided herein are swim goggles and mask designs that allow users to focus on forward vision for use above the waterline, and/or which allow improved vision along the user's peripheral field of view. Such goggles and masks provide the user additional viewing planes and angles as compared to traditional goggles and masks. Such swim goggles and masks make it easier to focus on forward-looking vision and provide greater peripheral vision both above and below the waterline without the need for the swimmer to excessively raise their head.

Provided herein are swimming goggles with a retroscopic lens angle and broad peripheral viewing angles to enhance a swimmer's forward-to-cranial-looking vision and peripheral vision both above and below the waterline during swimming activity.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees. 0.08 degrees, 0.07 degrees, 0.06 degrees, 0.05 degrees, 0.04 degrees, 0.03 degrees, 0.02 degrees or 0.01 degrees of a given value or range.

As used herein, "retroscopic", "retroscopic tilt" or "retroscopic angle", (also known as the opposite meaning of "pantoscopic angle"), means that angle which the frame or lens front makes with the frontal plane of the wearer's face wherein the lower aspect of the frame or lens rims are farther from the face than the upper frame or lens rims. Said alternatively, the frontal plane of the lens tilts toward the forehead of a user's face at the top lens and away from the chin of a user's face at the bottom of the lens.

As used herein, "retroversion" or "retroversion angle" when used in conjunction with "retroscopic" Or "retroscopic tilt" or "retroscopic angle", may also be referred to as a negative angle with respect to the orthogonal plane of the visual axis of the user, wherein the orthogonal plane is a plane that is perpendicular to the direct line of sight of a person or directly in front of a person. Alternatively an orthogonal plane may exist in a plane that is perpendicular to the peripheral line of sight or peripheral vision of a person or directly to side of a person.

Figure 1:
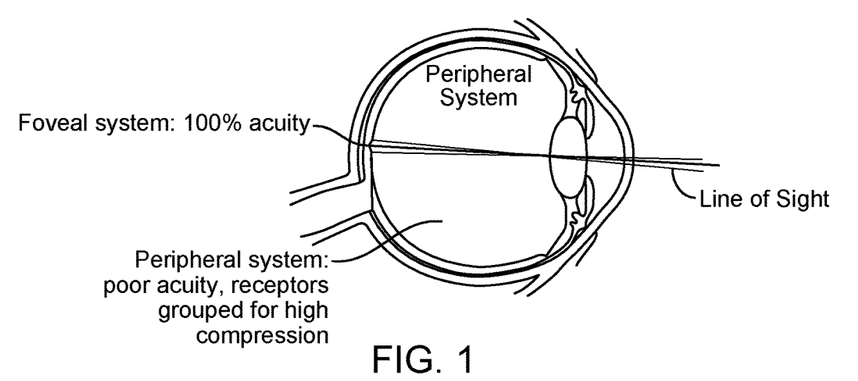
FIG. 1 is a cross-section of the human eye demonstrating the peripheral vision system.
Figure 2:
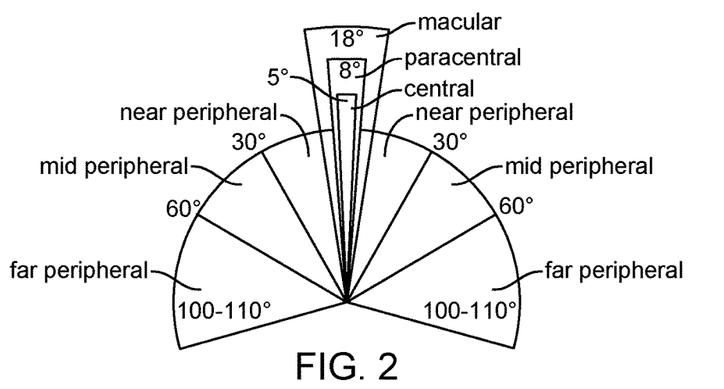
FIG. 2 is a graphic scale representation of the peripheral vision of the human eyes.
Figure 3:
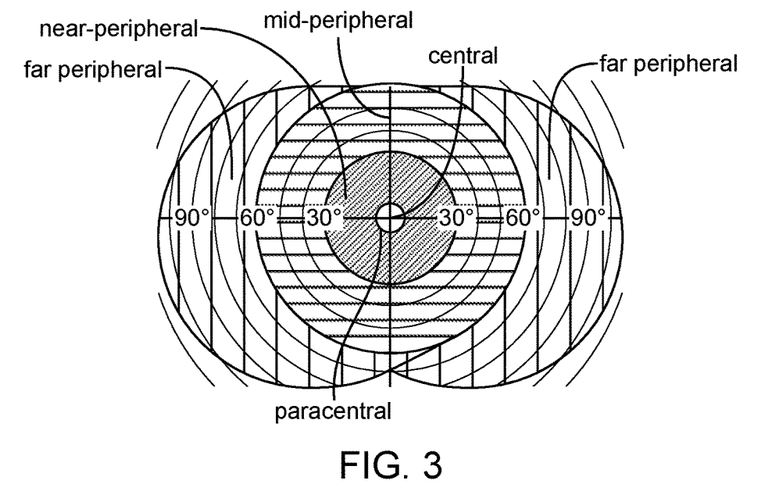
FIG. 3 is a graphic scale representation of the field of view of the human eyes.

As used herein, "peripheral view", "peripheral line of sight" "periphery" or "periphery vision" is a part of vision that occurs outside the very center of gaze. The inner boundaries of peripheral vision can be defined in any of several ways depending on the context. In common usage or everyday language the term "peripheral vision" is commonly used to refer to what in technical usage would be called "far peripheral vision." This is vision outside of the range of stereoscopic vision. As illustrated in FIGS. 1-3, there is a broad set of non-central points in the field of view that is included in the notion of peripheral vision. "Far peripheral" vision exists at the edges of the field of view, "mid-peripheral" vision exists in the middle of the field of view, and "near-peripheral", sometimes referred to as "paracentral" vision, exists adjacent to the center of gaze. In common usage or everyday language the term "peripheral vision" is commonly used to refer to what in technical usage would be called "far peripheral vision." This is vision outside of the range of stereoscopic vision. It can be conceived as bounded at the center by a circle 60 degrees to approximately 110 degrees in radius, or 120 degrees to 220 degrees diametrically, centered around the fixation point, i.e., the point at which one's gaze is directed.

The outer boundaries of peripheral vision correspond to the boundaries of the visual field as a whole. For a single eye, the extent of the visual field can be defined in terms of four angles, each measured from the fixation point, i.e., the point at which one's gaze is directed. These angles, representing four cardinal directions, are 60 degrees superior (up), 60 degrees nasal (towards the nose), 70 degrees to 75 degrees inferior (down), and 100 degrees to 110 degrees temporal (away from the nose and towards the temple). For both eyes the combined visual field is 130 degrees to 135 degrees vertical and 200 degrees to 220 degrees horizontal.

As used herein, and unless otherwise specified, the terms "forward-looking", "forward-to-cranial-looking" and similarly phrased terminology means, a line of vision directed out in front of a person in a prone (face down) position or supine (inverted, face up) position, or a field of vision that occurs when one looks up, or in a superior or cranial direction (towards the region above the eyebrows). Said alternatively, it is meant to mean that the line of sight (LoS) of the user is directed to an area that is angled in the superior (cardinal) direction (up), towards the forehead or towards an area in front of or above the cranium of the user, whether in a prone or supine position. One of skill in the art will immediately recognize through reading of this disclosure that the ability to have unimpeded vision, without seams or abrupt edges in the lenses, in a forward-to-cranial direction, particularly without the need to significantly crane one's head or neck, or to arch one's back in order to provide a clear uninterrupted line of vision, provides a swimmer or competitor with greatly improved vision without the need to disrupt their dynamic swimming form.

As used herein, and unless otherwise specified, the term "uninterrupted" means without a break in continuity. For example, this would include describing a change in a planar surface that has no seams, or is seamless. Alternative meanings include unbroken, continuous, continual, and unobstructed.

As used herein and unless otherwise specified, the term "contiguous" means, sharing a common border; is touching. Alternative meanings include adjacent, neighboring, adjoining, bordering, abutting, connecting, touching, and in immediate contact.

As used herein and unless otherwise specified, the terms "seamless", "contiguous", "uninterrupted" and similarly phrased terminology means, a surface that is smooth and without seams or obvious joints; smooth and continuous, with no apparent gaps, hard edges or spaces between one part and the next while being adjacent or adjoining and sharing a common border.

As used herein, and unless otherwise specified, the term "prone" means lying on the stomach and the term "supine" means lying on the back.

As used herein, and unless otherwise specified, the term "transparent" means allowing light to pass through so that objects can be distinctly seen, as in "transparent blue water". Common synonymous terms may include clear, crystal clear, see-through, pellucid and limpid. In some embodiments, it may be advantageous to modify the meaning of transparent wherein an alternative meaning may include translucent or shaded to mean that the clarity remains unaltered or dulled, but the "brightness", "tone", "luminance", "luminosity", and or "lightness" may be altered, allowing filtered light to pass through such as for example may occur with sunglasses, tinted or colored lenses.

As used herein, and unless otherwise specified, the term "anterior" refers to human anatomy and means the front surface of the body; often used to indicate the position of one structure relative to another, that is, situated nearer the front part of the body.

As used herein, and unless otherwise specified, the term "posterior" refers to human anatomy and means the back surface of the body. Often used to indicate the position of one structure relative to another, that is, nearer the back of the body.

As used herein, and unless otherwise specified, the term "superior" refers to human anatomy and means situated nearer the vertex of the head in relation to a specific reference point; opposite of inferior. It may also mean situated above or directed upward.

As used herein, and unless otherwise specified, the term "inferior" refers to human anatomy and means situated nearer the soles of the feet in relation to a specific reference point; opposite of superior. It may also mean situated below or directed downward.

As used herein, and unless otherwise specified, the term "medial" refers to human anatomy and means situated toward the median plane or midline of the body or a structure.

As used herein, and unless otherwise specified, the term "lateral" refers to human anatomy and means denoting a position farther from the median plane or midline of the body or a structure. It may also mean "pertaining to a side".

Provided herein are swimming goggles comprising a first eye piece comprising a first retroscopic lens surface in a frontal plane wherein an angle of retroversion as measured from an inferior edge to a superior edge of the lens surface is greater than 10 degrees with respect to an orthogonal plane of a visual axis of a user's direct line of sight (LoS) through the first retroscopic lens, wherein the first retroscopic lens provides an available cranial-looking range of vision (a) of at least 50 degrees, and a first uninterrupted contiguous side lens surface providing an available central fixation to temporal peripheral range of vision of at least 80 degrees.

In some embodiments, the goggles further comprise a second eye piece comprising a second retroscopic lens surface in the frontal plane wherein an angle of retroversion as measured from an inferior edge to a superior edge of the lens surface is greater than 10 degrees with respect to the orthogonal plane of the visual axis of the user's direct line of sight through the second retroscopic lens, wherein the second retroscopic lens provides an available cranial-looking range of vision ($\alpha$) of at least 50 degrees, and a second uninterrupted contiguous side lens surface providing an available central fixation to temporal peripheral range of vision of at least 80 degrees.

In some embodiments, the first uninterrupted contiguous side lens surface is retroverted at an angle as measured from an inferior edge to a superior edge of the lens surface at an angle of greater than 10 degrees with respect to the orthogonal plane of the visual axis of a user's peripheral line of sight.

In some embodiments, the first uninterrupted contiguous side lens surface is curved from an anterior aspect to a posterior aspect.

Figure 4A:
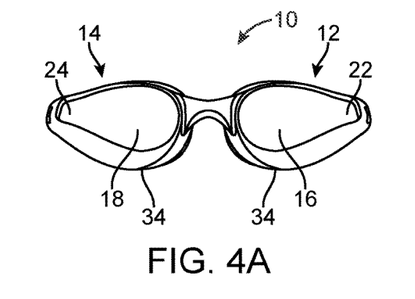
FIG. 4A is front view of the retroscopic goggles.
Figure 4B:
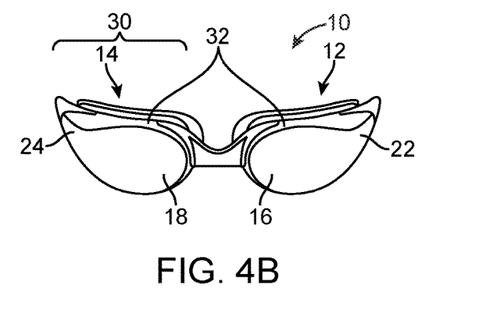
FIG. 4B is a top-front ISO view of the retroscopic goggles of FIG. 4.
Figure 5:
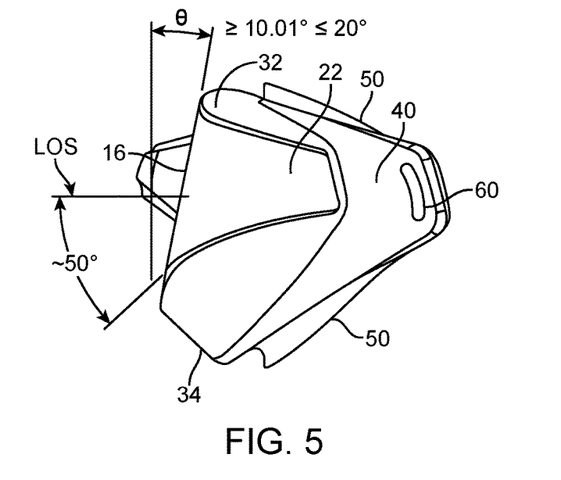
FIG. 5 is a side view of the retroscopic goggles of FIG. 4.

Referring now to FIGS. 4A-5, a set of goggles 10 is illustrated comprising a first eye piece 12 and a second eye piece 14, each eye piece having a contiguous, uninterrupted front lens surface 16, 18 positioned at a retroscopic angle "θ" greater than 10 degrees, and having a retroscopic angle range between at least 10.01 degrees and approximately 20 degrees. The goggles further comprise an uninterrupted, preferably seamless, contiguous and transparent side lens surface 22, 24 which may also be retroverted in some configurations.

In some embodiments, the first and second contiguous side lens surface 22, 24 is curved from an anterior aspect to a posterior aspect. In some embodiments, the contiguous side lens surface is retroverted at an angle "0" as measured from an inferior edge to a superior edge of the lens surface at an angle of greater than 10 degrees with respect to the orthogonal plane of the visual axis of a user's peripheral line of sight.

In some embodiments, the retroscopic lens surface 16, 18 is essentially flat as measured from a medial edge to a lateral edge of the retroverted lens surface in the frontal plane, meaning that there is no significant or intentional curvature formed in the lens.

Figure 10:
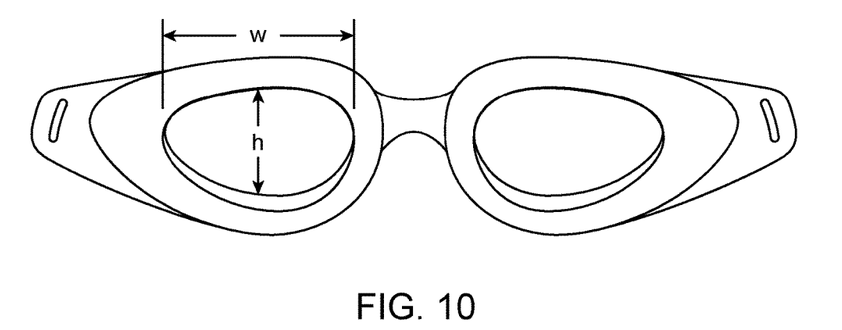
FIG. 10 is a rear view of the retroscopic goggles of FIG. 4, illustrating the proportional ranges of the retroscopic lenses and eye cup sockets.

As illustrated in FIG. 10, in some embodiments, the first retroscopic lens surface has a medial to lateral width ("w") between 44.0 mm and 50.0 mm in the frontal plane. In some embodiments, the first retroscopic lens surface has an inferior to superior height ("h") between 28.0 mm and 40.0 mm in the frontal plane.

Figure 11:
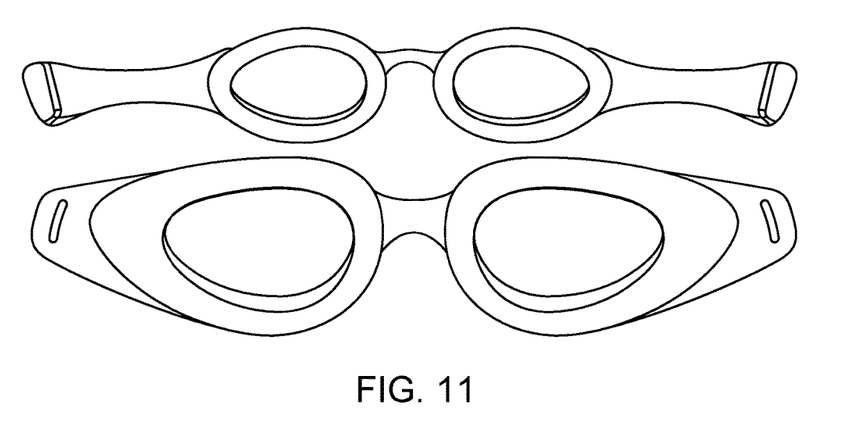
FIG. 11 is another rear view of the retroscopic goggles of FIG. 4, illustrating a comparison of the broader eye socket coverage for peripheral view.

In some embodiments, the first retroscopic lens surface has a width to height ratio ("w:h") between approximately 1.60:1 and 1.30:1 in the frontal plane. As further illustrated in FIG. 11, the width to height ratio combined with the retroscopic angle of the lenses provides a much larger lens and viewing angle range for the user when compared to traditional goggles.

It is understood that numerous ratios could be selected and are intended to produce various desirable results for the user. Subsequently, the range for the desirable ratios for this design includes any ratio from approximately 1.60:1, 1.59:1, 1.58:1, 1.57:1, 1.56:1 1.55:1, 1.54:1, 1.53:1, 1.52:1, 1.51:1, 1.50:1, 1.49:1, 1.48:1, 1.47:1, 1.46:1, 1.45:1, 1.44:1, 1.43:1, 1.42:1, 1.41:1, 1.40; 1, 1.39:1, 1.38:1, 1.37:1, 1.36:1, 1.35:1 1.34:1, 1.33:1, 1.32:1, 1.31:1 and 1.30:1

In some embodiments, the first retroscopic lens surface comprises a medial to lateral radius of curvature less than or equal to 20 degrees in the frontal plane of the retroverted lens surface as measured from the pupil of the eye. In some embodiments, the first retroscopic lens surface comprises a radius of curvature less than or equal to 10 degrees as measured from an inferior edge to a superior edge as measured from the pupil of the eye.

In some embodiments, the retroscopic lens surface comprises a minimum medial to lateral radius of curvature of 15 mm, or a maximum diopter of 22.5 in the frontal plane of the retroverted lens surface.

In some embodiments, the first retroscopic lens surface comprises a minimum inferior edge to a superior edge radius of curvature of 30 mm, or a maximum diopter of 11.25.

Figure 6A:
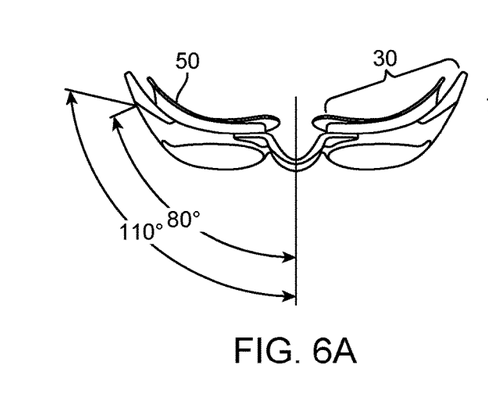
FIG. 6A is a top view of the retroscopic goggles of FIG. 4.
Figure 6B:
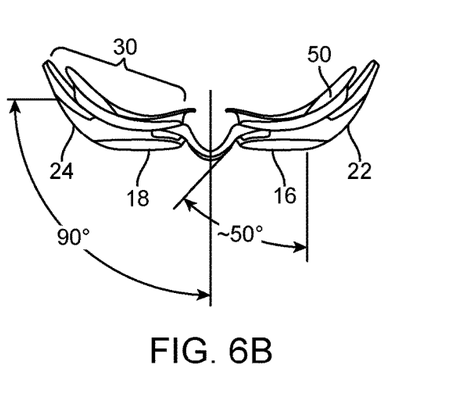
FIG. 6B is a pantoscopically rotated top view of the retroscopic goggles of FIG. 4.
Figure 7A:
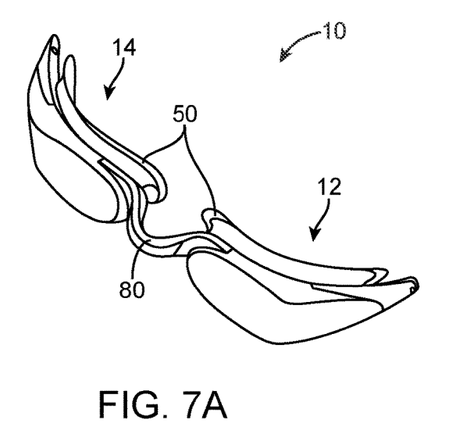
FIG. 7A is a top ISO view of the retroscopic goggles of FIG. 4.
Figure 7B:
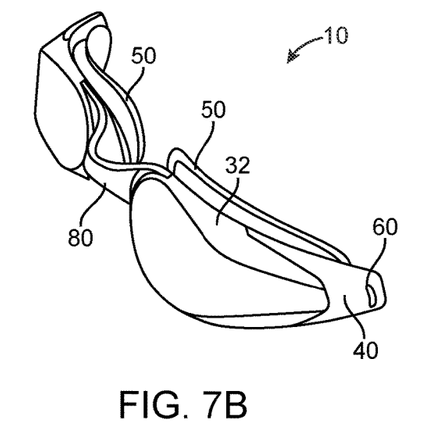
FIG. 7B is an alternative top ISO view of the retroscopic goggles of FIG. 4.
Figure 8:
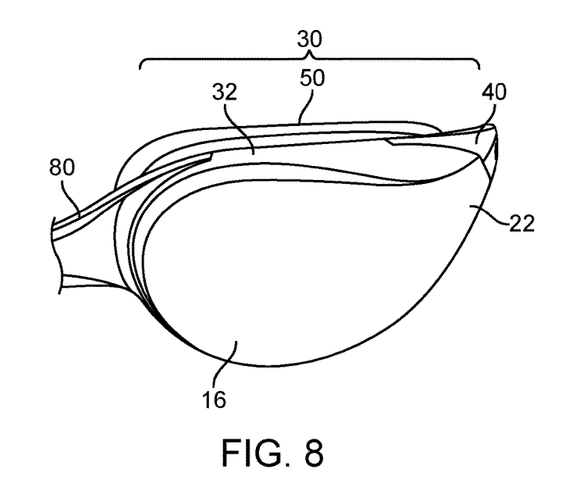
FIG. 8 is a detail front view of the retroscopic goggles of FIG. 4.
Figure 9A:
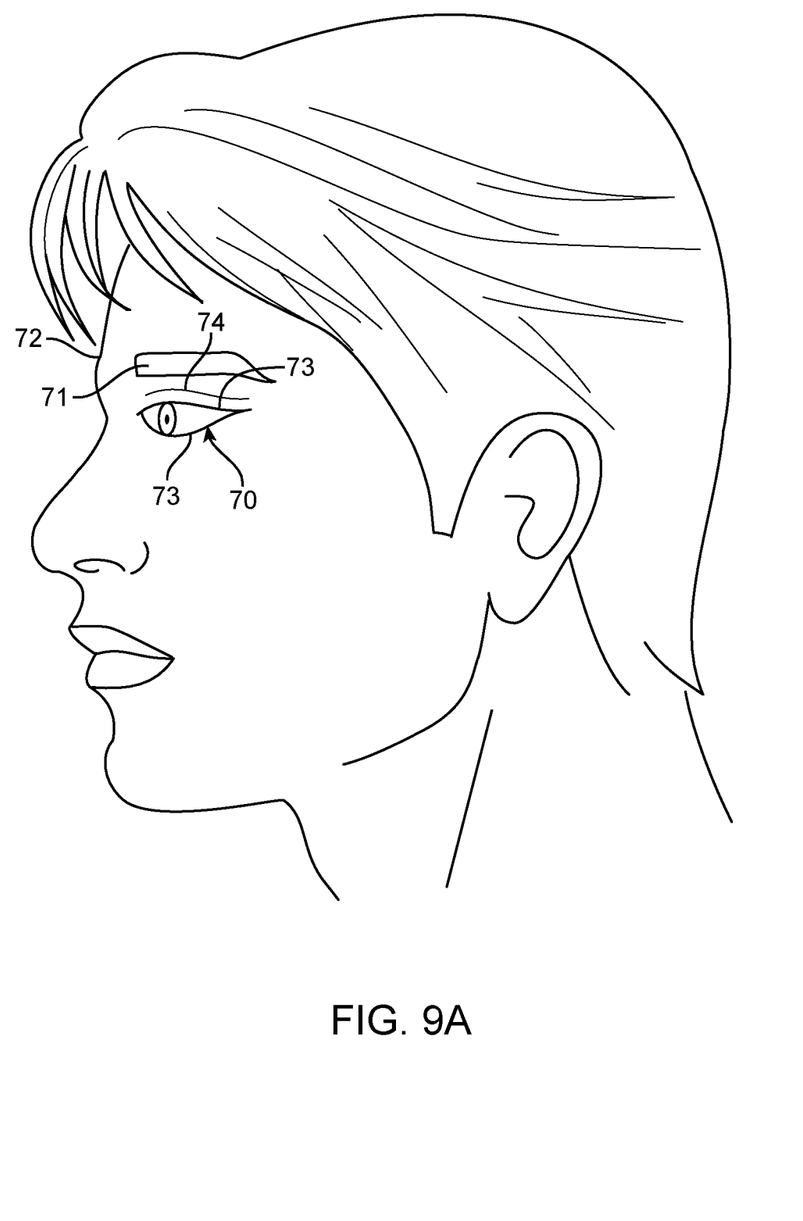
FIG. 9A is an illustrative profile view of a user's face indicating specific features around the eyes relevant to the shape and fit of the retroscopic goggles.
Figure 9B:
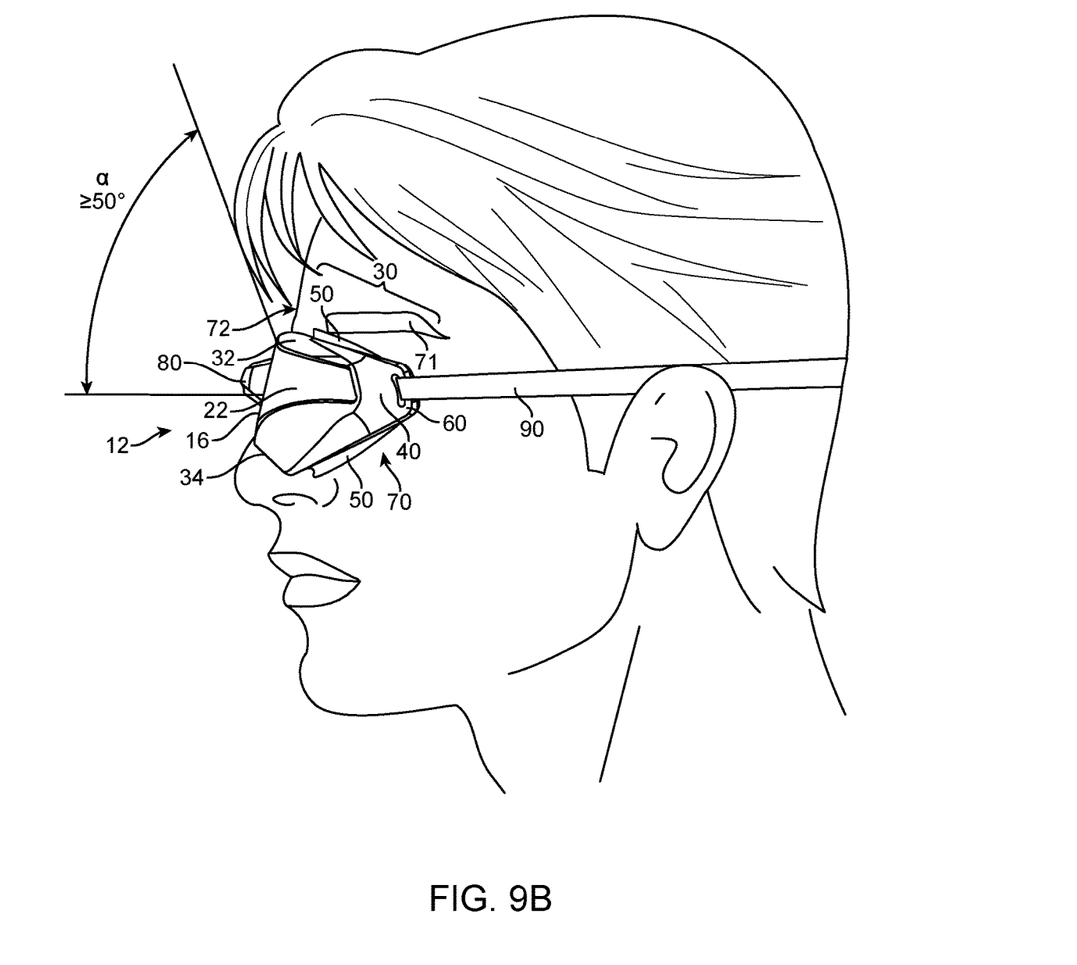
FIG. 9B is a shaded side view of the retroscopic goggles of FIG. 5A, illustrating placement on a user's head and face.

In some embodiments, a field of vision of the user is an island of vision measuring approximately 90 degrees temporally to central fixation, approximately ≥50 degrees superiorly (α), and approximately 50 degrees nasally, as illustrated in FIGS. 6A, 6B and 9B.

In some embodiments, the first eye piece further comprises a circumferential portion encapsulating the frontal plane retroscopic lens surface and an uninterrupted contiguous side lens surface to form an outer eye socket cup 30, as illustrated in FIGS. 5B and 9B, and adapted to approximately fit about the structural facial features of the user's eye socket, as illustrated in FIGS. 9A and 9B, wherein an inferior cheekbone portion 34 of said outer eye socket cup 30 extends beyond a superior eyebrow portion 32 of said outer eye socket cup 30 when viewed in a plane approximately parallel to a side of the user's face.

In some embodiments, the first eye piece further comprises an interior contact portion 50 adapted for contact with the soft tissue circumferentially around the eye of the user 73 within the eye socket 70 and, as illustrated in FIGS. 7A, 7B, 8 and FIGS. 9A & 9B. As is also apparent from FIGS. 9A & 9B, the inferior cheekbone portion 34 of said outer eye socket cup 30 extends beyond the anterior region of the eyebrow 72. In some embodiments, the superior portion of each of the outer eye socket cups is further adapted to approximately fit within the structural features the user's eye socket 70 approximately flush to the top rim of the eye socket 74; i.e.: at or below the eyebrow, 71 and below the forehead 72, providing an available cranial-looking range of vision (a) approximately greater than or equal to 50 degrees.

In some embodiments, the first outer eye socket cup further comprises a temporal extension 40 with a posteriorly extended attachment feature 60 adapted for receiving a head attachment band 90.

In some embodiments, the contact portion of the eye socket cup is further adapted to create a water-tight seal. In some embodiments, the contact portion 50 of the eye socket cup comprises a flexible polymer or foam capable of forming the water-tight seal.

Typical materials for the flexible polymer or foam can comprise thermoplastic polyurethane (TPU), thermoplastic rubber (TPR), Silicone, Silicone Foam, ethylene vinyl acetate foam (EVA Foam-injection molded, compression molded, sheet), Neoprene Foam, Silicone Fabric, Textile, PU-backed Nylon (polyurethane-backed Nylon), Latex, Vegetable Polymer, Marine Grade Rubber, Elastomers, Closed-cell Foam, Air Pockets, polyvinyl chloride (PVC), synthetic (poly) leather (PU) also known as bicast, bi-cast, bycast or split leather, and thermoplastic elastomers (TPE).

In some embodiments, the first eye piece and second eye piece are connected by a flexible bridging member 80. In some embodiments, the flexible bridging member is disassociable from each eye piece. In some embodiments, the flexible bridging member is provided in two or more lengths. Typical lengths for a flexible bridging member (also known as a nose bridge), range from a minimum length of 10.0 mm to a maximum length of 30.0 mm.

In some embodiments, the retroscopic transparent lens surface has an angle of retroversion between at least 10.01 degrees and approximately 20.0 degrees. In some embodiments, the retroscopic transparent lens surface has an angle of retroversion between at least 10.01 degrees and approximately 13.5 degrees. In still other embodiments, the retroscopic transparent lens surface has an angle of retroversion between 10.5 degrees and approximately 12.5 degrees.

It is understood that numerous ranges of retroscopic angles could be selected and are intended to produce various desirable results for the user. Subsequently, the range for the desirable retroscopic angle for this design includes any angle from 10.01 degrees to 10.1 degrees, from 10.01 degrees to 10.2 degrees, from 10.01 degrees to 10.3 degrees, from 10.01 degrees to 10.4 degrees, from 10.01 degrees to 10.5 degrees, from 10.01 degrees to 10.6 degrees, from 10.01 degrees to 10.7 degrees, from 10.01 degrees to 10.8 degrees, from 10.01 degrees to 10.9 degrees, from 10.01 degrees to 11.0 degrees, from 10.01 degrees to 11.1 degrees, from 10.01 degrees to 11.2 degrees, from 10.01 degrees to 11.3 degrees, from 10.01 degrees to 11.4 degrees, from 10.01 degrees to 11.5 degrees, from 10.01 degrees to 11.6 degrees, from 10.01 degrees to 11.7 degrees, from 10.01 degrees to 11.8 degrees, from 10.01 degrees to 11.9 degrees, from 10.01 degrees to 12.0 degrees, from 10.01 degrees to 12.1 degrees, from 10.01 degrees to 12.2 degrees, from 10.01 degrees to 12.3 degrees, from 10.01 degrees to 12.4 degrees, from 10.01 degrees to 12.5 degrees, from 10.01 degrees to 12.6 degrees, from 10.01 degrees to 12.7 degrees, from 10.01 degrees to 12.8 degrees, from 10.01 degrees to 12.9 degrees, from 10.01 degrees to 13.0 degrees, from 10.01 degrees to 13.1 degrees, from 10.01 degrees to 13.2 degrees, from 10.01 degrees to 13.3 degrees, from 10.01 degrees to 13.4 degrees, from 10.01 degrees to 13.5 degrees, from 10.01 degrees to 13.6 degrees, from 10.01 degrees to 13.7 degrees, from 10.01 degrees to 13.8 degrees, from 10.01 degrees to 13.9 degrees, from 10.01 degrees to 14.0 degrees, from 10.01 degrees to 14.1 degrees, from 10.01 degrees to 14.2 degrees, from 10.01 degrees to 14.3 degrees, from 10.01 degrees to 14.4 degrees, from 10.01 degrees to 14.5 degrees, from 10.01 degrees to 14.6 degrees, from 10.01 degrees to 14.7 degrees, from 10.01 degrees to 14.8 degrees, from 10.01 degrees to 14.9 degrees, from 10.01 degrees to 15.0 degrees, from 10.01 degrees to 15.1 degrees, from 10.01 degrees to 15.2 degrees, from 10.01 degrees to 15.3 degrees, from 10.01 degrees to 15.4 degrees, from 10.01 degrees to 15.5 degrees, from 10.01 degrees to 15.6 degrees, from 10.01 degrees to 15.7 degrees, from 10.01 degrees to 15.8 degrees, from 10.01 degrees to 15.9 degrees, from 10.01 degrees to 16.0 degrees, from 10.01 degrees to 16.1 degrees, from 10.01 degrees to 16.2 degrees, from 10.01 degrees to 16.3 degrees, from 10.01 degrees to 16.4 degrees, from 10.01 degrees to 16.5 degrees, from 10.01 degrees to 16.6 degrees, from 10.01 degrees to 16.7 degrees, from 10.01 degrees to 16.8 degrees, from 10.01 degrees to 16.9 degrees, from 10.01 degrees to 17.0 degrees, from 10.01 degrees to 17.1 degrees, from 10.01 degrees to 17.2 degrees, from 10.01 degrees to 17.3 degrees, from 10.01 degrees to 17.4 degrees, from 10.01 degrees to 17.5 degrees, from 10.01 degrees to 17.6 degrees, from 10.01 degrees to 17.7 degrees, from 10.01 degrees to 17.8 degrees, from 10.01 degrees to 17.9 degrees, from 10.01 degrees to 18.0 degrees, from 10.01 degrees to 18.1 degrees, from 10.01 degrees to 18.2 degrees, from 10.01 degrees to 18.3 degrees, from 10.01 degrees to 18.4 degrees, from 10.01 degrees to 18.5 degrees, from 10.01 degrees to 18.6 degrees, from 10.01 degrees to 18.7 degrees, from 10.01 degrees to 18.8 degrees, from 10.01 degrees to 18.9 degrees, from 10.01 degrees to 19.0 degrees, from 10.01 degrees to 19.1 degrees, from 10.01 degrees to 19.2 degrees, from 10.01 degrees to 19.3 degrees, from 10.01 degrees to 19.4 degrees, from 10.01 degrees to 19.5 degrees, from 10.01 degrees to 19.6 degrees, from 10.01 degrees to 19.7 degrees, from 10.01 degrees to 19.8 degrees, from 10.01 degrees to 19.9 degrees and from 10.01 degrees to 20.0 degrees.

Provided herein is swimming mask assembly comprising a first eye piece and a second eye piece configured to provide forward-to-cranial-looking vision to a user in a prone or supine position, the first eye piece comprising a first retroscopic lens surface in a frontal plane wherein an angle of retroversion as measured from an inferior edge to a superior edge of the lens surface is greater than 10 degrees with respect to the orthogonal plane of the visual axis of the user when the mask is worn by the user.

In some embodiments, the swimming mask assembly further comprises a second retroscopic lens surface in a frontal plane of the second eye piece wherein an angle of retroversion as measured from an inferior edge to a superior edge of the lens surface is greater than 10 degrees with respect to the orthogonal plane of the visual axis of the user when the mask is worn by the user.

In some embodiments, the first retroscopic lens surface further comprises an uninterrupted contiguous first side lens surface providing an available central fixation to temporal peripheral range of vision of at least 80 degrees.

In some embodiments, the first retroscopic lens surface provides an available cranial-looking range of vision (a) of at least 50 degrees above direct line of sight.

In some embodiments, the first contiguous side lens surface is curved from an anterior aspect to a posterior aspect. In some embodiments, the first contiguous side lens surface is retroverted greater than 10 degrees as measured from an inferior edge to a superior edge of the lens surface.

In some embodiments, the first uninterrupted retroscopic lens surface is flat as measured from a medial edge to a lateral edge.

In some embodiments, the first uninterrupted retroscopic lens surface has a medial to lateral width between 44.0 mm and 50.0 mm. In some embodiments, the first uninterrupted retroscopic lens surface has an inferior to superior height between 28.0 mm and 40.0 mm.

In some embodiments, the first uninterrupted retroscopic lens surface has a width to height ratio between approximately 1.60:1 and 1.30:1.

In some embodiments, the retroscopic lens surface comprises a minimum medial to lateral radius of curvature of 15 mm, or a maximum diopter of 22.5 in the frontal plane of the retroverted lens surface. In some embodiments, the first retroscopic lens surface comprises a minimum inferior edge to a superior edge radius of curvature of 30 mm, or a maximum diopter of 11.25.

In some embodiments, any of the lens surfaces are colored or tinted to reduce light glare or sunlight reflection.

In some embodiments, the first eye piece further comprises a circumferential portion encapsulating the retroscopic lens surface and the first uninterrupted contiguous side lens to form an eye socket cup adapted to approximately fit the facial features of the user's eye socket wherein an inferior cheekbone portion of said eye socket cup extends beyond a superior eyebrow portion of said eye socket cup when viewed in a plane approximately parallel to a side of the user's face.

In some embodiments, the retroscopic lens surface has an angle of retroversion between at least 10.01 degrees and approximately 20.0 degrees. In some embodiments, the retroscopic lens surface has an angle of retroversion between at least 10.01 degrees and approximately 13.5 degrees. In some embodiments, the retroscopic lens surface has an angle of retroversion between 10.5 degrees and approximately 12.5 degrees.

In some embodiments, a field of vision of the user is an island of vision measuring approximately 70 to 110 degrees temporally to central fixation, approximately 50 degrees superiorly, approximately 50 degrees inferiorly and approximately 50 degrees nasally.

In some embodiments, the first eye piece further comprises a contact portion adapted for contact with the soft tissue around the eye in the eye socket of the user. In some embodiments, the contact portion of the eye piece is further adapted to create a water-tight seal.

In some embodiments, the first eye socket cup further comprises a temporal extension 40 with a posteriorly extended attachment feature 60 adapted for a head attachment band 90.

In some embodiments, the first and second eye pieces are connected by a flexible bridging member 80. In some embodiments, the flexible bridging member is disassociable from the first and second eye pieces. In some embodiments, the flexible bridging member is provided in two or more interchangeable lengths.

Provided herein are swimming goggles comprising a first eye piece and a second eye piece, each eye piece having a retroscopic lens surface in a retroverted frontal plane, comprising a first lens surface and a second lens surface, configured to raise the line of sight of the eyes of a user cranially to at least 50 degrees above direct line of sight in order to visually sight objects in a forward-to-cranial-looking view when the user is in a prone position.

In some embodiments, each retroscopic lens surface has an angle of retroversion between at least 10.01 degrees and approximately 20.0 degrees. In some embodiments, each retroscopic lens surface has an angle of retroversion between at least 10.01 degrees and approximately 13.5 degrees. In some embodiments, each retroscopic lens surface has an angle of retroversion between 10.5 degrees and approximately 12.5 degrees.

In some embodiments, the first retroscopic lens surface further comprises a first uninterrupted contiguous side lens surface and the second retroscopic lens surface further comprises a second uninterrupted contiguous side lens surface providing an available central fixation to temporal peripheral range of vision of at least 80 degrees for each eye piece.

In some embodiments, the first and second contiguous side lens surface is curved from an anterior aspect to a posterior aspect.

In some embodiments, the first and second contiguous side lens surface is retroverted greater than 10 degrees as measured from an inferior edge to a superior edge of the lens surface.

In some embodiments, the first retroscopic lens surface is flat as measured from a medial edge to a lateral edge.

In some embodiments, the first retroscopic lens surface has a medial to lateral width between 44.0 mm and 50.0 mm. In some embodiments, the first retroscopic lens surface has an inferior to superior height between 28.0 mm and 40.0 mm. In some embodiments, the first retroscopic lens surface has a width to height ratio between approximately 1.60:1 and 1.30:1.

In some embodiments, the retroscopic lens surface comprises a minimum medial to lateral radius of curvature of 15 mm, or a maximum diopter of 22.5 in the frontal plane of the retroverted lens surface. In some embodiments, the first retroscopic lens surface comprises a minimum inferior edge to a superior edge radius of curvature of 30 mm, or a maximum diopter of 11.25.

In some embodiments, any of the lens surfaces are colored or tinted to reduce light glare or sunlight reflection.

In some embodiments, each of the first and second eye pieces further comprise a circumferential portion encapsulating the first and second retroscopic lens surfaces and the first and second uninterrupted contiguous side lens surfaces to form first and second eye socket cups adapted to approximately fit the facial features around the user's eye sockets, wherein an inferior cheekbone portion of each first and second eye socket cup extends beyond a superior eyebrow portion of each first and second eye socket cup when viewed from a plane approximately parallel to the side of user's face.

In some embodiments, a field of vision for an eye of the user is an island of vision measuring approximately 70 to 110 degrees temporally to central fixation, at least 50 degrees superiorly when the eye of the user is above or below the waterline, and approximately 50 degrees nasally.

In some embodiments, each of the first and second eye pieces further comprise a contact portion adapted for contact with the soft tissue around the eye in the eye socket of the user.

In some embodiments, the contact portion of the eye piece is further adapted to create a water-tight seal.

In some embodiments, the first and second eye socket cups each further comprise a temporal extension with a posteriorly extended attachment feature adapted for a head attachment band.

In some embodiments, the first and second eye pieces are connected by a flexible bridging member. In some embodiments, the flexible bridging member is disassociable from each piece.

Provided herein is a kit for swimming goggles comprising a first eye piece comprising a first retroscopic lens surface, a second eye piece comprising a second retroscopic lens surface, wherein each first and second retroscopic lens surface is positioned in a retroverted frontal plane configured to raise a line of sight of a user cranially to at least 50 degrees above a direct line of sight in a forward-to-cranial-looking view, either above or below a waterline; a first uninterrupted contiguous side lens surface affixed to the first retroscopic lens surface, a second uninterrupted contiguous side lens surface affixed to the second retroscopic lens surface, a first eye socket cup circumferentially encapsulating the first retroscopic lens surface and the first uninterrupted contiguous side lens surface, a second eye socket cup circumferentially encapsulating the second retroscopic lens surface and the second uninterrupted contiguous side lens surface; a first contact portion on the first eye piece adapted for contact with a soft tissue around a first eye in a first eye socket of a user, a second contact portion on the second eye piece adapted for contact with a soft tissue around a second eye in a second eye socket of a user; a first temporal extension with a posteriorly extended attachment feature in communication with the first eye socket cup, a second temporal extension with a posteriorly extended attachment feature in communication with the second eye socket cup, wherein each temporal attachment feature is adapted to receive a flexible head attachment band; the flexible attachment band; and a flexible nose bridging member; wherein the first eye socket cup comprising the first retroscopic lens surface, the first uninterrupted contiguous side lens surface, the first contact portion and the first extended posterior temporal attachment feature, forms a first eye piece sub-assembly, wherein the second eye socket cup comprising the second retroscopic lens surface, the second uninterrupted contiguous side lens surface, the second contact portion and the second extended posterior temporal attachment feature, forms a second eye piece sub-assembly, and wherein the first eye piece sub-assembly and the second eye piece sub-assembly form an eye piece sub-assembly pair, wherein the eye piece sub-assembly pair is assemblable between the eye socket cups with the flexible bridging member and further assemblable with the flexible attachment band affixed to the first and second extended posterior temporal attachment feature.

In some embodiments, the eye socket cup is adapted to approximately fit the facial features around a user's eye socket wherein an inferior cheekbone portion of each said eye socket cup extends beyond a superior eyebrow portion of each said eye socket cup when viewed in a plane approximately parallel to a side of the user's face.

In some embodiments, the flexible bridging member is disassociable from the eye socket cup sub-assembly pair. In some embodiments, the kit comprises two or more sizes of flexible bridging member.

In some embodiments, the first and/or second retroscopic lens surface in the frontal plane is provided with prescription lenses.

One skilled in the art will recognize that some high performance athletes have a need for prescription lenses. Competition swimming is no different. Professional competition swimmers, triathletes and others also require prescription lenses—similar to safety glasses/masks worn by professional athletes. Unfortunately, prior to this, none have been conceived or developed.

In some embodiments, the first and/or second retroscopic lens surface in the frontal plane is provided with a "positive meniscus lens".

In some embodiments, the first and/or second retroscopic lens surface in the frontal plane is provided with a thin lens. A thin lens is a lens with a thickness (distance along the optical axis between the two surfaces of the lens) that is negligible compared to the radii of curvature of the lens surfaces. Lenses whose thickness is not negligible are sometimes called thick lenses. An ideal thin lens with two surfaces of equal curvature would have zero optical power, meaning that it would neither converge nor diverge light. All real lenses have nonzero thickness, however, which makes a real lens with identical curved surfaces slightly positive. To obtain exactly zero optical power, a meniscus lens must have slightly unequal curvatures to account for the effect of the lens' thickness.

In some embodiments, the first and second retroscopic lens surfaces have an angle of retroversion between at least 10.01 degrees and approximately 20.0 degrees. In some embodiments, the first and second retroscopic lens surfaces have an angle of retroversion between at least 10.01 degrees and approximately 13.5 degrees. In some embodiments, the first and second retroscopic lens surfaces have an angle of retroversion between 10.5 degrees and approximately 12.5 degrees.

In some embodiments, the first retroscopic lens surface in the frontal plane and the first uninterrupted contiguous side lens surface provide an available central fixation to temporal peripheral range of vision of at least 90 degrees.

In some embodiments, the first and second contiguous side lens surfaces are curved from an anterior aspect to a posterior aspect. In some embodiments, the first and second contiguous side lens surfaces are retroverted at least 10 degrees as measured from an inferior edge to a superior edge of the lens surface.

In some embodiments, the first and second retroscopic lens surfaces are flat as measured from a medial edge to a lateral edge of the retroverted lens surface.

In some embodiments, the first and second retroscopic lens surfaces have a medial to lateral width between 44.0 mm and 50.0 mm. In some embodiments, the first and second retroscopic lens surfaces have an inferior to superior height between 28.0 mm and 40.0 mm. In some embodiments, the first and second retroscopic lens surfaces have a width to height ratio between approximately 1.60:1 and 1.30:1.

In some embodiments, the retroscopic lens surface comprises a minimum medial to lateral radius of curvature of 15 mm, or a maximum diopter of 22.5 in the frontal plane of the retroverted lens surface. In some embodiments, the first retroscopic lens surface comprises a minimum inferior edge to a superior edge radius of curvature of 30 mm, or a maximum diopter of 11.25.

In some embodiments, any of the lens surfaces are colored or tinted to reduce light glare or sunlight reflection.

In some embodiments, a field of vision of each eye of the user is an island of vision measuring approximately 70 to 110 degrees temporally to central fixation, at least 50 degrees superiorly when the eyes of the user are above or below a waterline, and approximately 50 degrees nasally.

Provided herein are swimming goggles comprising a first eye piece and a second eye piece, each eye piece comprising a retroscopic lens surface in a frontal plane, wherein an angle of retroversion is measured from an inferior edge to a superior edge of the lens surface, wherein a user's forward-to-cranial-looking vision is increased by greater than 10 degrees with respect to the orthogonal plane of the visual axis of the user when swimming.

In some embodiments, the user's forward-to-cranial-looking vision is increased by up to approximately 20.0 degrees.

In some embodiments, the user's face is above the waterline. In some embodiments, the user's face is below the waterline.

In some embodiments, the user is in a prone position. In some embodiments, the user is in a supine position.

In some embodiments, the user improves their forward-to-cranial-looking vision by greater than 10 degrees without changing one's optimal head-neck angle when swimming in a prone position.

In some embodiments, the user improves their forward-to-cranial-looking vision by greater than 10 degrees without changing one's optimal head-neck angle when swimming in a supine position.

While preferred embodiments of the present device have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the device described herein may be employed in practicing the invention. It is intended that the following claims define the scope of the invention and that methods and structures within the scope of these claims and their equivalents be covered thereby.

What is claimed is:

1. Swimming goggles comprising:
a first eye piece having;
a first retroscopic lens surface in a frontal plane wherein an angle of retroversion as measured from an inferior edge to a superior edge of the lens surface is greater than 10 degrees with respect to an orthogonal plane of a visual axis of a user's direct line of sight through the first retroscopic lens, wherein the first retroscopic lens provides an available cranial-looking range of vision of at least 50 degrees, and
a first uninterrupted contiguous side lens surface providing an available central fixation to temporal peripheral range of vision of at least 80 degrees;
wherein the first retroscopic lens surface has a medial to lateral width between 44.0 mm and 50.0 mm in the frontal plane.

2. The swimming goggles of claim 1, wherein the first retroscopic lens surface has an inferior to superior height between 28.0 mm and 40.0 mm in the frontal plane.

3. The swimming goggles of claim 1, wherein the first retroscopic lens surface comprises a minimum medial to lateral radius of curvature of 15 mm, or a maximum diopter of 22.5 in the frontal plane of the retroverted lens surface.

4. The swimming goggles of claim 1, wherein the first retroscopic lens surface comprises a minimum radius of curvature of 30 mm, or a maximum diopter of 11.25 when measured from an inferior edge to a superior edge.

5. The swimming goggles of claim 1, wherein any of the lens surfaces are provided with prescription lenses.

6. The swimming goggles of claim 1, wherein any of the lens surfaces are colored or tinted to reduce light glare or sunlight reflection.

7. Swimming goggles comprising:
a first eye piece;
a second eye piece;
wherein the first eye piece comprises a first retroscopic lens surface between a 10.0 degree and 15.0 degree retroverted frontal plane and the second eye piece comprises a second retroscopic lens surface between a 10.0 degree and 15.0 degree retroverted frontal plane,
a first uninterrupted contiguous side lens surface adjoining the first retroscopic lens surface;
a second uninterrupted contiguous side lens surface adjoining the second retroscopic lens surface;
wherein the first uninterrupted contiguous side lens surface and the second retroscopic lens surface each provide an available central fixation to temporal peripheral range of vision of at least 80 degrees for each eye piece.

8. The swimming goggles of claim 7, wherein the first uninterrupted contiguous side lens surface and the second uninterrupted contiguous side lens surface is retroverted between 10.0 degrees and 15.0 degrees as measured from an inferior edge to a superior edge of either uninterrupted contiguous side lens surface.

9. The swimming goggles of claim 7, wherein the first and second retroscopic lens surface has a medial to lateral width between 44.0 mm and 50.0 mm.

10. The swimming goggles of claim 7, wherein the first and second retroscopic lens surface has an inferior to superior height between 28.0 mm and 40.0 mm.

11. The swimming goggles of claim 7, wherein the first and second retroscopic lens surface has a width to height ratio between approximately 1.60:1 and approximately 1.30:1.

12. The swimming goggles of claim 7, wherein the first retroscopic lens surface and second retroscopic lens surface comprise a minimum medial to lateral radius of curvature of 15 mm, or a maximum diopter of 22.5 in the frontal plane of the retroverted lens surface.

13. The swimming goggles of claim 7, wherein any of the lens surfaces are provided with prescription lenses.

14. The swimming goggles of claim 7, wherein any of the lens surfaces are colored or tinted to reduce light glare or sunlight reflection.

15. The swimming goggles of claim 7, wherein the first eye piece and second eye piece are each connected by a flexible bridging member.

16. The swimming goggles of claim 15, wherein the flexible bridging member is disassociable from each piece.

17. A swimming mask assembly comprising:
a first eye piece having a first uninterrupted contiguous first side lens surface providing an available central fixation to temporal peripheral range of vision of at least 70 degrees; and
a second eye piece having a second uninterrupted contiguous first side lens surface providing an available central fixation to temporal peripheral range of vision of at least 70 degrees;
wherein said first eye piece and said second eye piece are configured to provide forward-to-cranial-looking vision to a user in a prone or a supine position,
wherein the first eye piece comprises a first retroscopic lens surface in a frontal plane,
wherein the second eye piece comprises a second retroscopic lens surface in a frontal plane,
wherein an angle of retroversion as measured from an inferior edge to a superior edge of the first retroscopic lens surface and second retroscopic lens surface is greater than 10 degrees with respect to an orthogonal plane of a visual axis of the user when the mask is worn by the user.

18. The swimming mask assembly of claim 17, wherein the first and second retroscopic lens surfaces provide an available cranial-looking range of vision of at least 50 degrees above a direct line of sight.

19. The swimming mask assembly of claim 17, wherein the first and second contiguous side lens surfaces are curved from an anterior aspect to a posterior aspect.

20. The swimming mask assembly of claim 17, wherein the first and second contiguous side lens surfaces are retroverted greater than 10.0 degrees as measured from an inferior edge to a superior edge of the lens surface.

21. The swimming mask assembly of claim 17, wherein the first and second retroscopic lens surfaces have an angle of retroversion between at least 10.01 degrees and approximately 20.0 degrees.

22. The swimming mask assembly of claim 17, wherein the first and second retroscopic lens surfaces have an angle of retroversion between at least 10.01 degrees and approximately 13.5 degrees.

23. The swimming mask assembly of claim 17, wherein the first and second retroscopic lens surfaces have an angle of retroversion between about 10.5 degrees and approximately 12.5 degrees.

24. The swimming mask assembly of claim 17, wherein the first and second uninterrupted contiguous side lens surfaces have an angle of retroversion between at least 10.01 degrees and approximately 20.0 degrees.

25. The swimming mask assembly of claim 17, wherein the first and second uninterrupted retroscopic lens surfaces are flat as measured from a medial edge to a lateral edge.

26. The swimming mask assembly of claim 17, wherein the first and second retroscopic lens surfaces comprise a minimum medial to lateral radius of curvature of 15 mm, or a maximum diopter of 22.5 in the frontal plane of the retroverted lens surface.

27. The swimming mask assembly of claim 17, wherein the first and second uninterrupted retroscopic lens surfaces have a width to height ratio between approximately 1.60:1 and 1.30:1.

28. The swimming mask assembly of claim 17, wherein any of the lens surfaces are colored or tinted to reduce light glare or sunlight reflection.

29. The swimming mask assembly of claim 17, wherein any of the lens surfaces are provided with prescription lenses.

30. The swimming mask assembly of claim 17, wherein a field of vision of the user is an island of vision measuring approximately 70 to 110 degrees temporally to central fixation, approximately 50 degrees cranially, approximately 50 degrees inferiorly and approximately 50 degrees nasally.

31. The swimming mask assembly of claim 17, wherein the first and second eye pieces are connected by a flexible bridging member.

32. The swimming mask assembly of claim 31, wherein the flexible bridging member is disassociable from the first and second eye pieces.

* * * * *